United States Patent
Harmon et al.

(10) Patent No.: US 11,565,594 B2
(45) Date of Patent: Jan. 31, 2023

(54) VEHICLE AND BATTERY CHARGING SYSTEM FOR A VEHICLE

(71) Applicant: FORD GLOBAL TECHNOLOGIES, LLC, Dearborn, MI (US)

(72) Inventors: Michael John Harmon, Westland, MI (US); Tithal Bhandari, Streamwood, IL (US); Hussain Z Tajmahal, Detroit, MI (US); Yejin Han, Detroit, MI (US); Ryan Warner, Ann Arbor, MI (US); Rachel Williams, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/332,263

(22) Filed: May 27, 2021

(65) Prior Publication Data

US 2022/0379745 A1  Dec. 1, 2022

(51) Int. Cl.
*B60L 53/12* (2019.01)
*B60L 53/36* (2019.01)
(Continued)

(52) U.S. Cl.
CPC .............. *B60L 53/12* (2019.02); *B60L 50/50* (2019.02); *B60L 53/36* (2019.02); *B60L 53/38* (2019.02);
(Continued)

(58) Field of Classification Search
CPC .......... B60L 53/12; B60L 50/50; B60L 53/36; B60L 53/38; H01M 10/44; H01M 2220/20; H02J 50/10; H02J 50/90
See application file for complete search history.

(56) References Cited

U.S. PATENT DOCUMENTS 9,381,821 B2    7/2016  Keeling et al.
2003/0006619 A1*  1/2003  Byun ................... B60R 19/28
                                             293/135
(Continued)

FOREIGN PATENT DOCUMENTS

KR      20160010471 B1    1/2016
KR         102123139 B1    6/2020
WO          20105397 A1    5/2020

OTHER PUBLICATIONS

O. C. Onar, "Modeling, Simulation, and Experimental Verification of a 20-kW Series-Series Wireless Power Transfer System for a Toyota RAV4 Electric Vehicle," 2018 IEEE Transportation Electrification Conference and Expo (ITEC), 2018, pp. 874-880, (Year: 2018).*

(Continued)

*Primary Examiner* — Pinping Sun
(74) *Attorney, Agent, or Firm* — David B Kelley; Brooks Kushman P.C.

(57) ABSTRACT

A vehicle includes a body and a charging pad. The body defines first and second wheel wells on opposing lateral sides of the body. The body defines a cavity along a bottom surface of the body between the wheel wells and a rear end of the vehicle. The charging pad is disposed within the cavity such that the charging pad spans a distance between the first and second wheel wells. The charging pad has a secondary coil disposed therein. The secondary coil is configured to receive electrical power from a primary coil of a charging station via induction to recharge a vehicle battery.

18 Claims, 6 Drawing Sheets

(51) Int. Cl.
  *B60L 50/50*   (2019.01)
  *H02J 50/10*   (2016.01)
  *H02J 50/90*   (2016.01)
  *H01M 10/44*   (2006.01)
  *B60L 53/38*   (2019.01)
(52) U.S. Cl.
  CPC ............. *H01M 10/44* (2013.01); *H02J 50/10* (2016.02); *H02J 50/90* (2016.02); *H01M 2220/20* (2013.01)

(56) References Cited

U.S. PATENT DOCUMENTS

| | | | | |
|---|---|---|---|---|
| 2010/0235006 | A1* | 9/2010 | Brown | B60L 53/126 |
| | | | | 700/286 |
| 2012/0319644 | A1* | 12/2012 | Hu | H02J 50/90 |
| | | | | 320/108 |
| 2014/0225433 | A1* | 8/2014 | Niizuma | B60L 53/36 |
| | | | | 307/104 |
| 2014/0253025 | A1* | 9/2014 | Van Wiemeersch | H02J 50/70 |
| | | | | 320/108 |
| 2014/0340027 | A1* | 11/2014 | Keeling | B60L 53/36 |
| | | | | 320/108 |
| 2014/0340035 | A1* | 11/2014 | Maekawa | B60L 53/38 |
| | | | | 320/108 |
| 2015/0035484 | A1* | 2/2015 | Mashinsky | B60L 50/53 |
| | | | | 320/108 |
| 2015/0263536 | A1* | 9/2015 | Niizuma | H02J 50/60 |
| | | | | 307/104 |
| 2016/0072304 | A1* | 3/2016 | Anders | H01F 27/361 |
| | | | | 307/104 |
| 2016/0089987 | A1* | 3/2016 | Ichikawa | H02J 5/005 |
| | | | | 180/65.265 |
| 2016/0101701 | A1* | 4/2016 | Wu | B60L 53/38 |
| | | | | 320/108 |
| 2018/0194239 | A1 | 6/2018 | Chevret et al. | |
| 2018/0339597 | A1 | 11/2018 | Kruszelnicki | |
| 2018/0339601 | A1 | 11/2018 | Kruszelnicki | |
| 2019/0135133 | A1* | 5/2019 | Miller | B60L 53/14 |
| 2019/0344668 | A1 | 11/2019 | Penney | |
| 2019/0371515 | A1* | 12/2019 | Ha | H02J 50/70 |
| 2020/0079237 | A1 | 3/2020 | Seong et al. | |
| 2020/0353839 | A1 | 11/2020 | Tarchinski et al. | |
| 2021/0138919 | A1* | 5/2021 | Weber | H01R 13/6205 |

OTHER PUBLICATIONS

GreenCarCongress, "More details on the Mercedes-Benz EQS," Apr. 2021, pp. 1-14 (Year: 2021).*

Cambridge,"definition of slope" pp. 1-8 (Year: NA).*

* cited by examiner

VEHICLE AND BATTERY CHARGING SYSTEM FOR A VEHICLE

TECHNICAL FIELD

The present disclosure relates to hybrid/electric vehicles and charging systems for hybrid/electric vehicles.

BACKGROUND

Hybrid/electric vehicles may be propelled by electric machines that draw power from batteries.

SUMMARY

A vehicle includes a body and a charging pad. The body defines first and second wheel wells on opposing lateral sides of the body. The body defines a cavity along a bottom surface of the body between the wheel wells and a rear end of the vehicle. The charging pad is disposed within the cavity such that the charging pad spans a distance between the first and second wheel wells. The charging pad has a secondary coil disposed therein. The secondary coil is configured to receive electrical power from a primary coil of a charging station via induction to recharge a vehicle battery.

A vehicle includes a body, a rear axle, an electric machine, a battery, and a secondary coil. The body has a length and a width. The rear axle extends along the width of the body. The rear axle and has first and second wheels. The electric machine is configured to propel the vehicle. The battery is configured to deliver electrical power to the electric machine. The secondary coil is secured to a bottom of the body. The secondary coil is disposed between the rear axle and a rear end of the vehicle along the length of the body. The secondary coil spans a distance between the first and second wheels along the width of the body. The secondary coil is configured to receive electrical power from a primary coil via induction to recharge the battery.

A battery charging system includes a charging station, a vehicle, and a control system. The charging station has a platform, a charger pad, and a first actuator. The platform is secured to a ground surface. The charger pad is disposed along a top end of the platform. The charger pad has a primary coil disposed therein. The first actuator is configured to raise and lower the charger pad relative to the platform. The vehicle has a body, an electric machine, a battery, a charging pad, and a second actuator. The electric machine is configured to propel the vehicle. The battery is configured to deliver electrical power to the electric machine. The charging pad is secured to a bottom of the body. The charging pad has a secondary coil disposed therein. The secondary coil is configured to receive electrical power from the primary coil via induction to recharge the battery. The second actuator is configured to raise and lower the secondary coil relative to the body. The control system programmed to, in response to a command to park the vehicle to recharge the battery, automatically park the vehicle such that the charging pad is disposed above and aligned with the charger pad. The control system is further programmed to, in response to alignment between the charger pad and the charging pad, operate the first actuator to raise the charger pad and operate the second actuator to lower the charging pad such that the charger pad and charging pad are in contact with each other. The control system is further programmed to, in response to the charger pad and charging pad being in contact with each other, transfer electric power from the primary coil to the secondary coil via induction to charge the battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
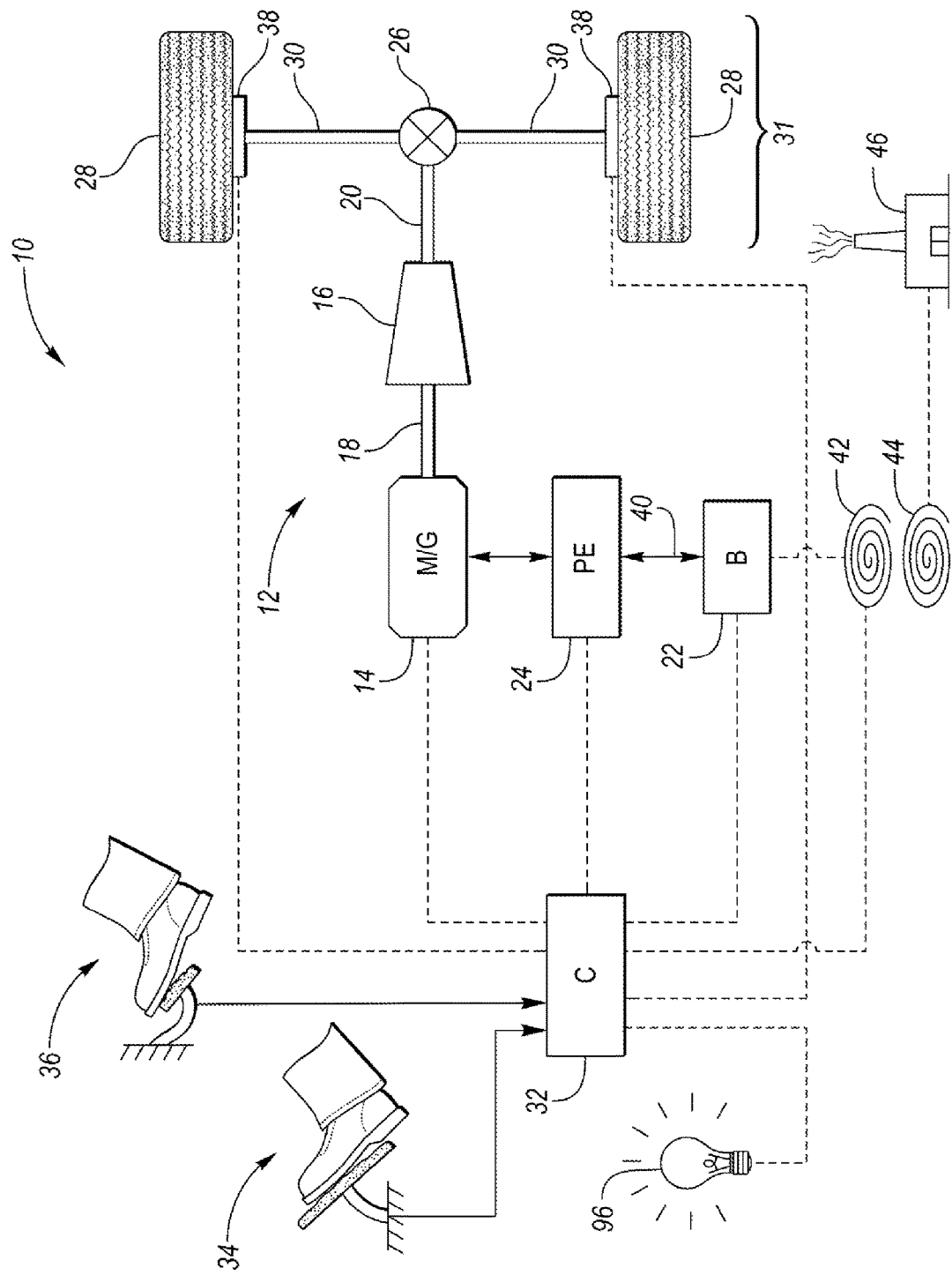
FIG. 1 is a schematic illustration of a representative powertrain of an electric vehicle and a charging system for the electric vehicle.
Figure 2:
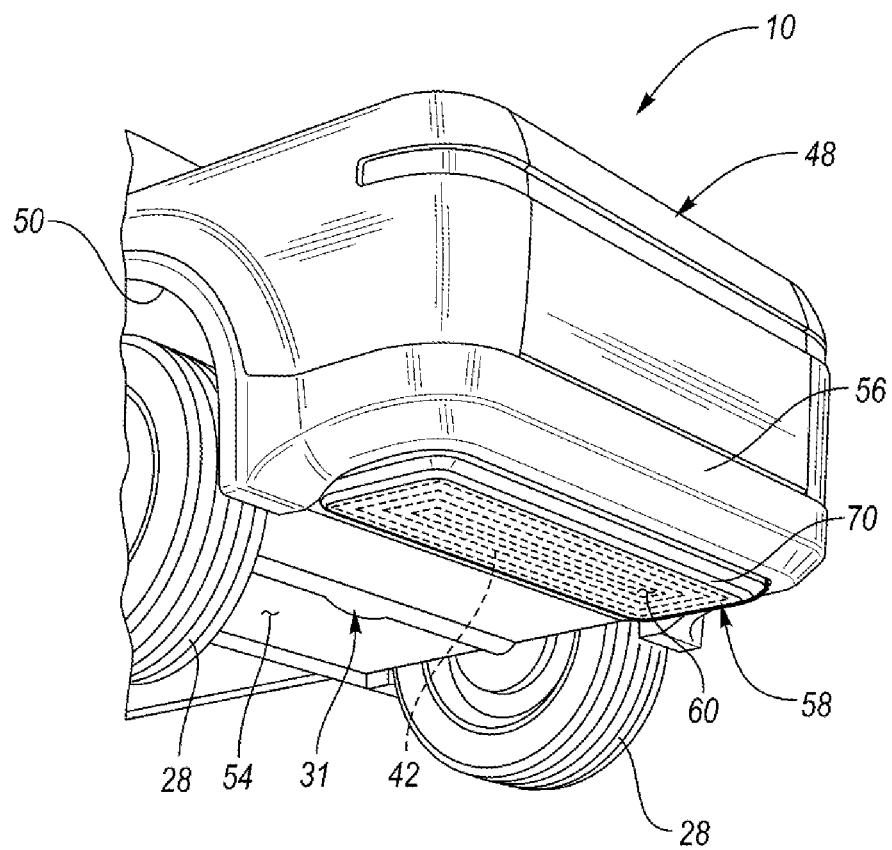
FIG. 2 is an isometric bottom view of a vehicle having a charging pad with the charging pad in a stowed or retracted position.
Figure 3:
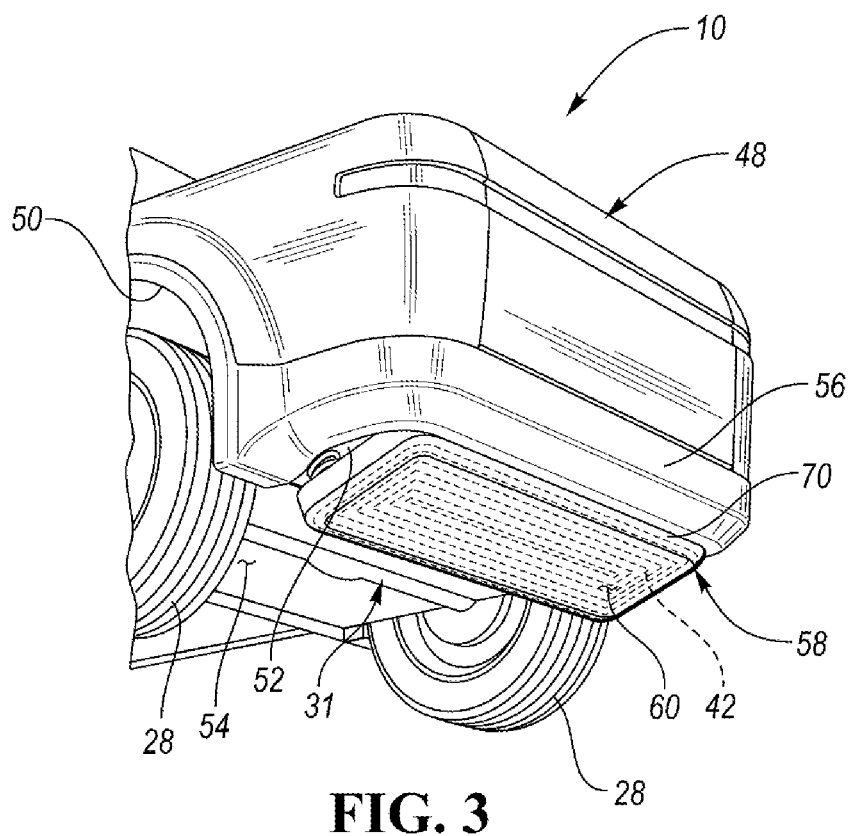
FIG. 3 is an isometric bottom view of the vehicle with the charging pad in an engaged or advanced position.
Figure 4:
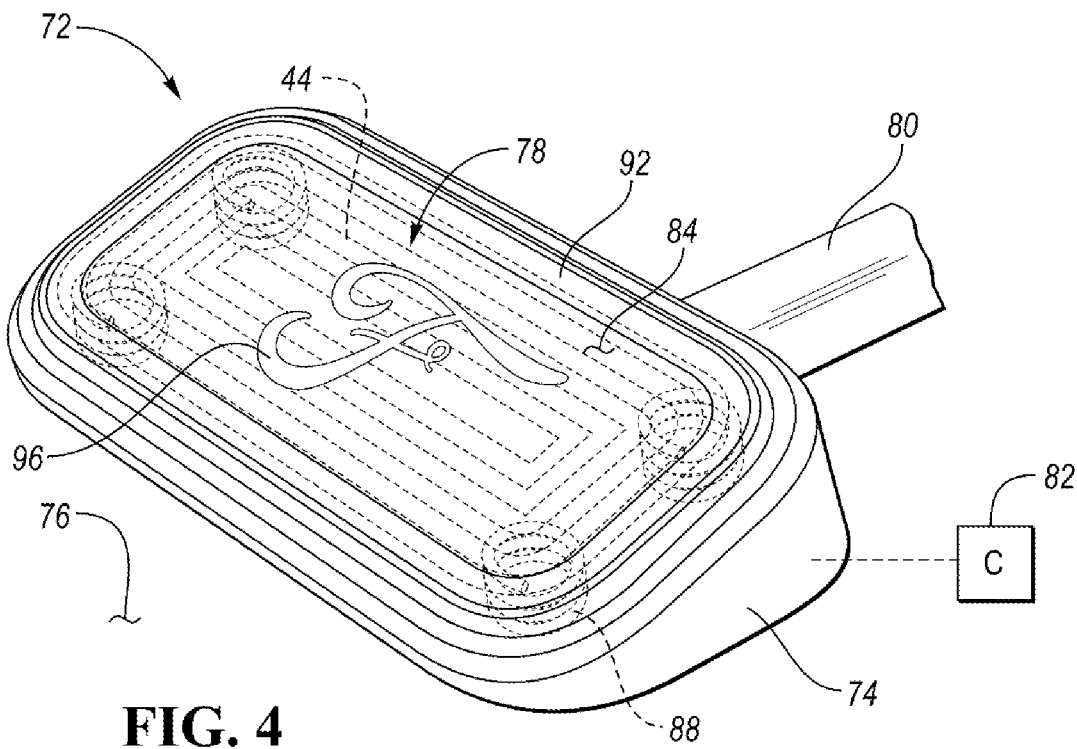
FIG. 4 is an isometric top view of a charging station having a charger pad with the charger pad in a stowed or retracted position.
Figure 5:
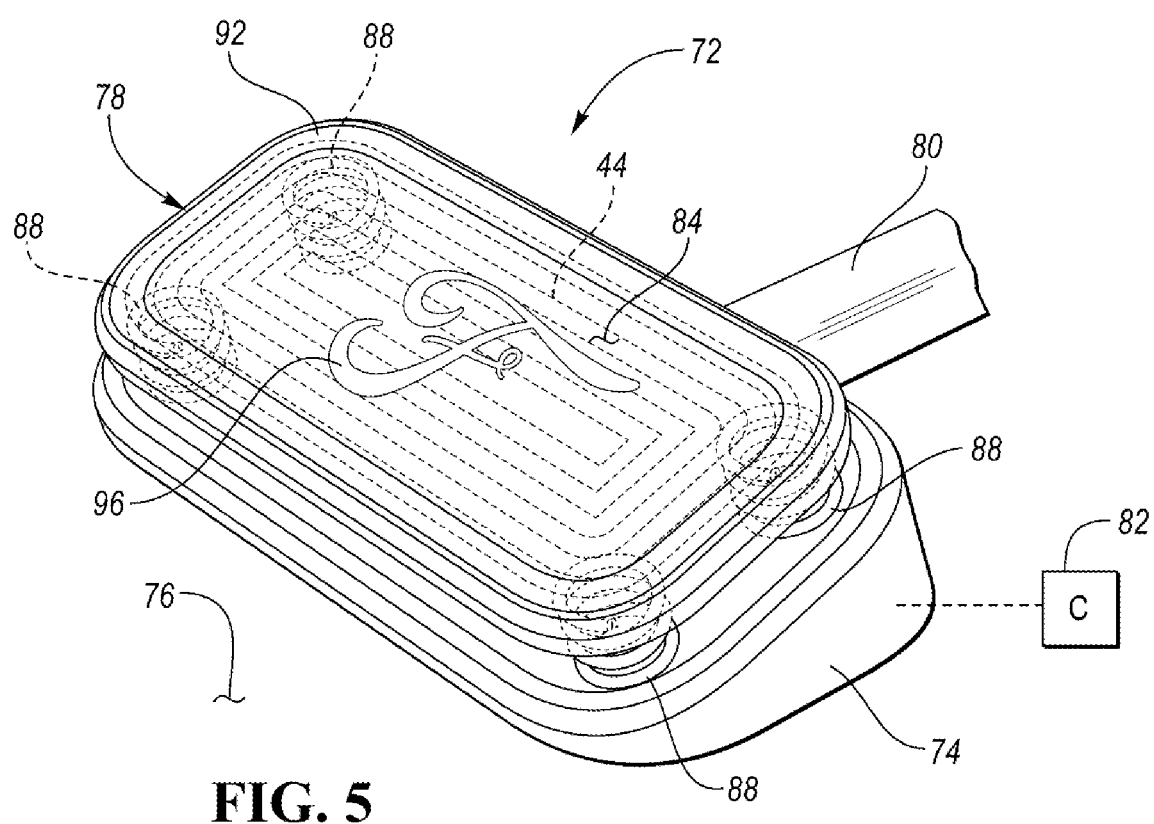
FIG. 5 is an isometric top view of the charging station with the charger pad in an engaged or advanced position.
Figure 6:
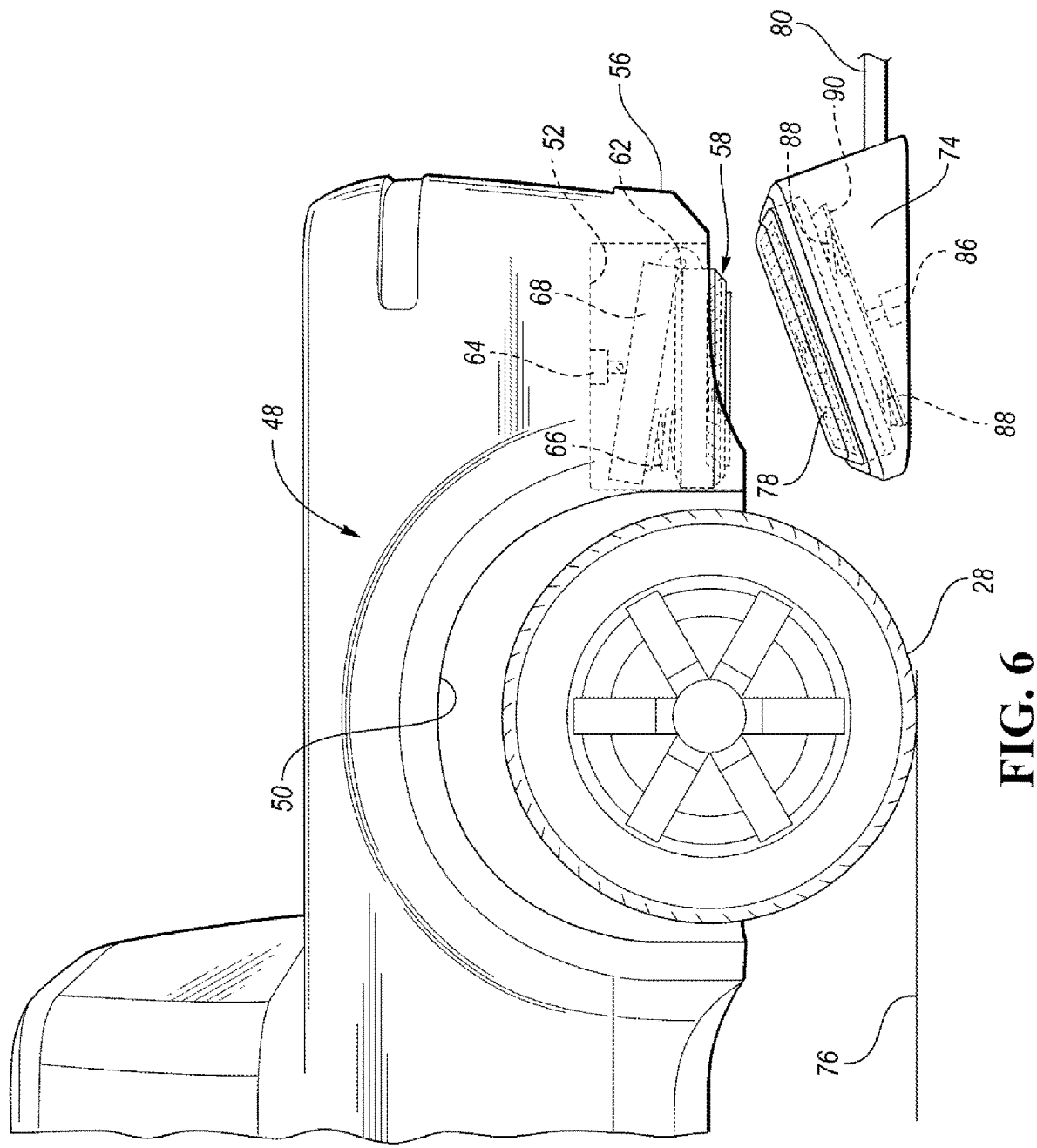
FIG. 6 is a side view of the vehicle and the charging station with the charging pad and the charger pad both in the stowed or retracted positions.
Figure 7:
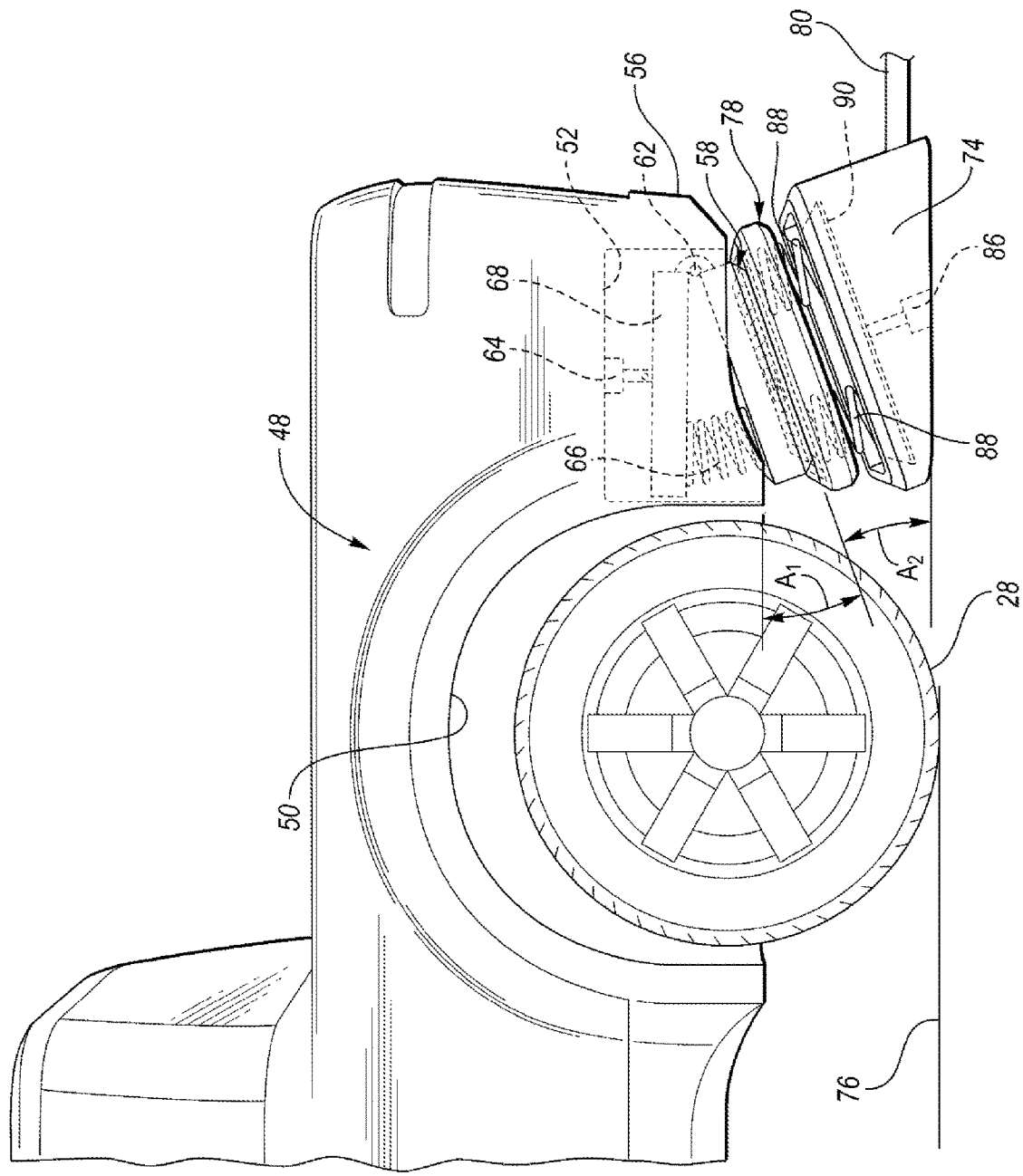
FIG. 7 is a side view of the vehicle and the charging station with the charging pad and the charger pad both in the engaged or advanced positions.
Figure 8:
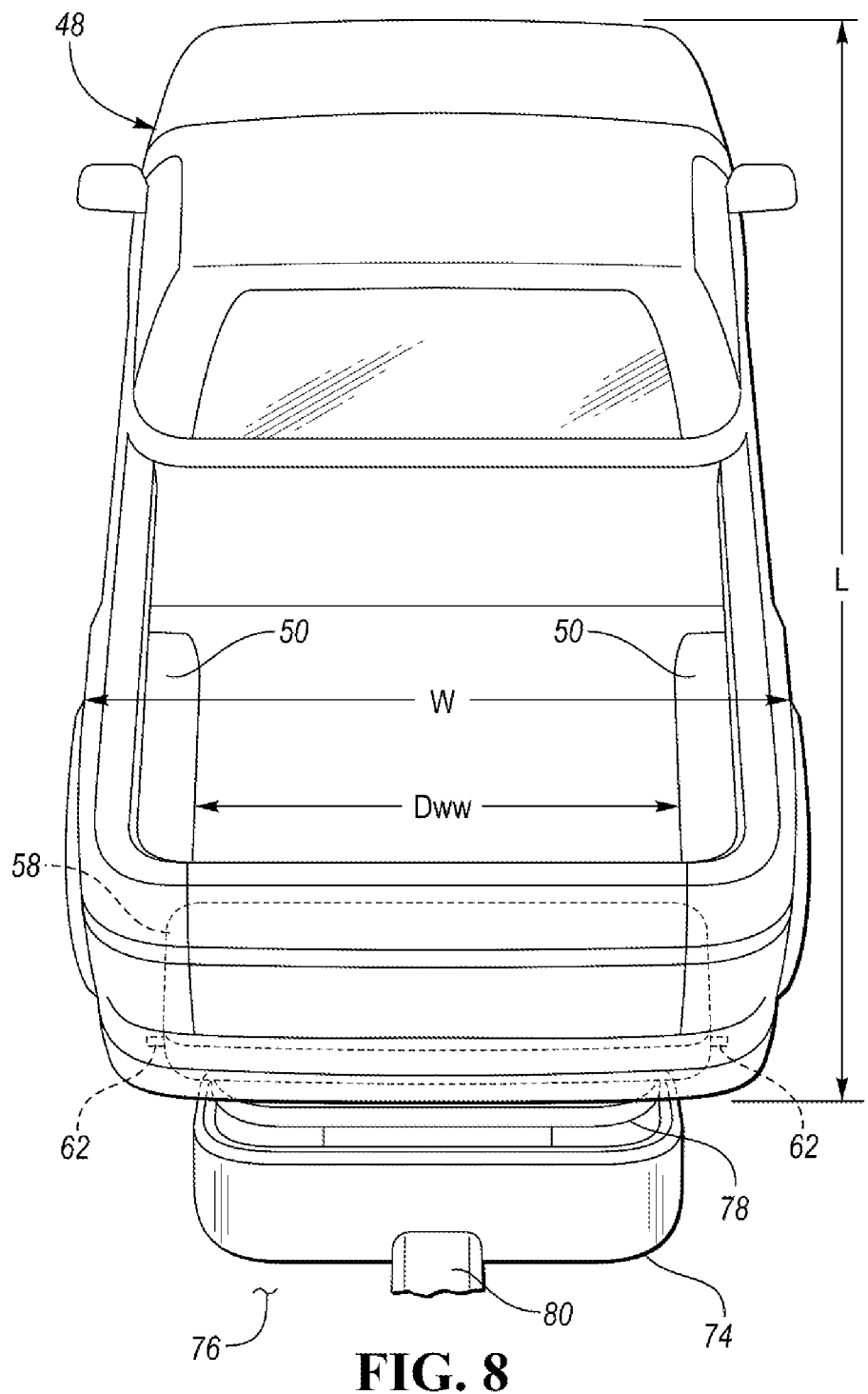
FIG. 8 is an isometric top view of the vehicle with the charging pad and the charger pad both in the engaged or advanced positions.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective half shafts 30 that are connected to the differential 26. The differential 26 transmits approximately equal torque to each wheel 28 via the half shafts 30 while permitting slight speed differences such as when the vehicle turns a corner. The differential 26, half shafts 30, and wheels 28 may collectively form an axle 31. The axle 31 may more specifically be a rear axle. The axle 31 may include additional subcomponents that are not illustrated such as universal joints. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may be configured to receive power from an external power source to charge the battery 22. For example, the vehicle 10 may include a secondary coil 42 that is configured to receive power from and a primary coil 44 via induction to charge the battery 22. The primary coil 44 may be external to the vehicle. The primary coil 44 may be connected to a power grid that receives electrical power from a power plant 46.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Referring to FIGS. 2-3 and 6-8, the vehicle 10 is further illustrated. The vehicle 10 includes a body 48. The body 48 defines wheel wells 50. The wheel wells 50 may more specifically include first and second wheel wells 50 that are disposed on opposing lateral sides of the body 48. The body 48 defines a cavity 52 along a bottom surface 54 of the body 48 between the wheel wells 50 and a rear end 56 of the vehicle 10. The cavity 52 may extend upward from the bottom surface 54 of the body 48. The body of the vehicle 10 has a length, L, and a width, W. The axle 31 extends along the width, W, of the body 48. Each of the wheels 28 of the axle 31 are disposed within one of the wheel wells 50.

The vehicle includes a charging pad 58 secured to the bottom of the body 48 and disposed within the cavity 52. The charging pad 58 spans a distance, $D_{ww}$, between the wheel wells 50. More specifically, the charging pad 58 may span the distance, $D_{ww}$, between the wheel wells 50 and have a dimensional length along the width, W, of the body 48 that is greater than the distance, $D_{ww}$, between the wheel wells 50. The charging pad 58 is disposed between the axle 31 and the rear end 56 of the vehicle 10 along the length, L, of the body 48. The charging pad 58 is also disposed between the wheel wells 50 and the rear end 56 of the vehicle 10 along the length, L, of the body 48. The secondary coil 42 is disposed within the charging pad 58. The secondary coil 42 may also span the distance, $D_{ww}$, between the wheel wells 50. The secondary coil 42 is configured to receive electrical power from the primary coil 44 via induction to recharge the battery 22. The primary coil 44 may be a subcomponent of a charging station that is external to the vehicle 10. The design of the charging pad 58 allows for a compact design that is easily accessible due to its location along the rear end 56 of the vehicle 10 while at the same time allows for an increased charging rate due to its wide base that spans and is be greater than the distance, $D_{ww}$, between the wheel wells 50.

A bottom surface 60 of the charging pad 58 may be oriented at an angle, $A_1$, relative to the bottom surface 54 of the body 48 that ranges between ranges between 10° and 30°. The orientation of the charging pad 58 may be permanently fixed or may be adjustable. In embodiments where the orientation charging pad 58 is adjustable, the charging pad 58 may be rotatably secured to the body 48 via hinges 62 and may be configured to rotate via the hinges 62 relative to the body 48 between a stowed or retracted position during a non-charging event (e.g., FIGS. 2 and 6) and an engaged or advanced position during a charging event (e.g., FIGS. 3 and 7-8). In the stowed or retracted position, the bottom surface 60 of the charging pad 58 may be substantially parallel with the bottom surface 54 of the body 48. In the stowed or retracted position, the secondary coil 42 may also be substantially parallel with the bottom surface 54 of the body 48. Substantially parallel may refer to any incremental value between exactly parallel and 5° from exactly parallel. In the engaged or advanced position, the bottom surface 60 of the charging pad 58 may be oriented at an angle relative to the bottom surface 54 of the body 48 that ranges between ranges between 10° and 30°. In the engaged or advanced position, the secondary coil 42 may also be oriented at an angle relative to the bottom surface 54 of the body 48 that ranges between ranges between 10° and 30°.

An actuator 64 may be secured to the body 48 and the charging pad 58. The actuator 64 may be configured to raise and lower the charging pad 58 relative to the body 48 via the hinges 62 to transition the charging pad 58 between the stowed or retracted position and the engaged or advanced position. The actuator 64 may be any type of actuator, such as, but not limited to, a pneumatic cylinder, a hydraulic cylinder, an electric motor (e.g., a servo motor), and electric solenoid, etc. The actuator 64 may be in communication with controller 32. The actuator 64 may be rotatably secured to the charging pad 58 via a pin to allow for rotation between the actuator and the charging pad 58.

In embodiments where the orientation of the charging pad 58 is fixed, the charging pad 58 may be all or mostly disposed within the cavity 52 defined along the bottom surface 54 of the body 48 to protect the charging pad from the external elements (e.g., snow or rain). Furthermore, in embodiments where the orientation of the charging pad 58 is fixed relative to embodiments where the orientation charging pad 58 is adjustable, the charging pad 58 may have a higher position relative to the body 48, requiring a higher relative position of the primary coil 44 during charging.

One or more springs 66 may secured to the charging pad 58. The springs 66 may be disposed between the charging pad 58 and a base plate 68. That base plate 68 may also be configured to rotate about the hinges 62. More specifically, the base plate 68 may be configured to rotate about the hinges 62 in unison with the charging pad 58. The actuator 64 may more specifically be connected to the base plate 68. The one or more springs 66 are configured to compensate for positional tolerances of the charging pad 68 during an engagement between the charging pad 68 and a charger pad that houses the primary coil 44 during a charging event. An elastic bumper 70 may be secured to the bottom surface 60 of the charging pad 58. The elastic bumper 70 may be configured to engage (e.g., contact) the charger pad that houses the primary coil 44 during a charging event.

Referring to FIGS. 4-8, a charging station 72 for the vehicle 10 is illustrated. More specifically, the charging station may be configured to charge the battery 22 of the vehicle 10. The vehicle 10 and the charging station 72 may collectively be referred to as a battery charging system. The charging station 72 includes a platform 74 that is secured to a ground surface 76. A charger pad 78 is disposed along a top end of the platform 74. The primary coil 44 is disposed within the charger pad 78. The charger pad 78 (and the charging station 72 as a whole) is narrower than the distance, between the wheel wells 50 in order to prevent interference between the wheels 28 and the charger pad 78 during vehicle charging and while the vehicle 10 is parking over the charging station 72 prior to vehicle charging. A power chord 80 may connect the charging station 72 to a power source, such as a power grid. The charging station 72 may also include a controller 82 that has the same or similar characteristics as described above with respect to controller 32. Although not illustrated as such, the controller 82 may disposed within the housing forming the platform 74. Controllers 32 and 82 may communicate with each other during charging or while the vehicle 10 is performing a parking maneuver prior to charging. Such communication may be any form of wireless communication including, but not limited to, radio, Bluetooth, Wi-Fi, etc. Such communication may be directly between the controllers or over a wireless network.

A top surface 84 of the charger pad 78 may be oriented at an angle, $A_2$, relative to the ground surface 76 of the body 48 that ranges between ranges between 10° and 30°. More specifically, the top surface 84 of the charger pad 78 may be oriented at angle, $A_2$, and the bottom surface 60 of the charging pad 58 may be oriented at angle, $A_1$, such that the bottom surface 60 of the charging pad 58 and the top surface 84 of the charger pad 78 are substantially parallel relative to each other. Substantially parallel may refer to any incremental value between exactly parallel and 5° from exactly parallel. The position of the charger pad 78 relative to the platform 74 may be adjustable. More specifically, the charger pad 78 may be linearly secured to the platform 74 such that the charger pad 78 is adjustable between a stowed or retracted position during a non-charging event (e.g., FIGS. 4 and 6) and an engaged or advanced position during a charging event (e.g., FIGS. 5 and 7-8). In the stowed or retracted position, the charger pad 78 is retracted downward toward the platform 74. In the engaged or advanced position, the charger pad 78 extends upward and away from the platform 74 and toward the charging pad 58. In the engaged or advanced position, the top surface 84 of the charger pad 78 engages the bottom surface 60 of the charging pad 58. The distance of travel of the charger pad 78 from the stowed or retracted position to the engaged or advanced position may be increased if the charging pad 58 is in a fixed position on the body 48 of the vehicle 10.

An actuator 86 may be secured to the platform 74 and the charger pad 78. More specifically, the actuator 86 may be disposed within the platform 74. The actuator 86 may be configured to raise and lower the charger pad 78 relative to the platform 74 to transition the charger pad 78 between the stowed or retracted position and the engaged or advanced position. The actuator 86 may be any type of actuator, such as, but not limited to, a pneumatic cylinder, a hydraulic cylinder, an electric motor (e.g., a servo motor), and electric solenoid, etc. The actuator 86 may be in communication with controller 82.

One or more springs 88 may secured to the charger pad 78. The springs 88 may be disposed between the charger pad 78 and a base plate 90. The base plate 90 may also be configured to raise and lower via the actuator 86. More specifically, the base plate 90 may be configured to raise and lower in unison with the charger pad 78 and the actuator 88 may be directly secured to the base plate 90. The one or more springs 88 are configured to compensate for positional tolerances of the charger pad 78 during an engagement between the charger pad 78 and the charging pad 58. An elastic bumper 92 may be secured to the top surface 60 of the charging pad 58. The elastic bumper 92 may be configured to engage (e.g., contact) the charging pad 58 during a charging event.

Controller 32 and controller 82 may work in conjunction to form a control system that is configured to control automatically parking of the vehicle 10 and charging of the vehicle battery 22. The control system may be programmed to, in response to a command to park the vehicle 10 to recharge the battery 22, automatically park the vehicle 10 such that the charging pad 58 is disposed above and aligned with the charger pad 78. A command to park the vehicle 10 may be a command to automatically park the vehicle 10, which may be triggered by an operator command or action. For example, the operator may push a button to automatically park the vehicle 10, may audibly command the vehicle 10 to park, or may take an action such as stepping out of the vehicle 10 at a destination that is proximate to the charging station 72. The automated parking may comprise parking the vehicle in reverse. Once the charging pad 58 is aligned with the charger pad 78, the control system may be programmed to operate the actuator 86 to raise the charger pad 78 and operate the actuator 64 to lower the charging pad 58 such that the charger pad 78 and charging pad 58 are in contact with each other. Once the charger pad 78 and charging pad 58 are in contact with each other, the control system may be programmed to transfer electric power from the primary coil 44 to the secondary coil 42 via induction to charge the battery 22.

Once battery charging has commenced a light indicator 94 (see FIG. 1) on the exterior of the vehicle may be illuminated, which represents the charging state. The light indicator 94 may be located on the front of the vehicle 10. The light indicator 94 may be any type of light source, such as one or more light emitting diodes or incandescent bulbs. When the light indicator 94 is not illuminated, no charging is occurring, which may represent that a proper connection between the primary coil 44 to the secondary coil 42 has not been made or that charging is complete. The light indicators may take the shape of a logo (see item 96 in FIG. 4).

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a body defining first and second wheel wells on opposing lateral sides of the body, and defining a cavity along a bottom surface of the body between the first and second wheel wells and a rear end of the vehicle;
    a charging pad disposed within the cavity such that the charging pad spans a distance between the first and second wheel wells, the charging pad having a secondary coil disposed therein, wherein the secondary coil is configured to receive electrical power from a primary coil of a charging station via induction to recharge a vehicle battery; and
    an elastic bumper (i) secured to a bottom surface of the charging pad and (ii) configured to engage a charger pad housing the primary coil during a charging event, wherein the elastic bumper is separated from the body by the charging pad.

2. The vehicle of claim 1, wherein a bottom surface of the charging pad is oriented at an angle relative to the bottom surface of the body that ranges between 10° and 30°.

3. The vehicle of claim 1, wherein the charging pad is rotatably secured to the body and is configured to rotate relative to the body between a stowed position during a non-charging event and an engaged position during the charging event.

4. The vehicle of claim 3, wherein a bottom surface of the charging pad is substantially parallel with the bottom surface of the body in the stowed position.

5. The vehicle of claim 3, wherein a bottom surface of the charging pad is oriented at an angle relative to the bottom surface of the body that ranges between 10° and 30° in the engaged position.

6. The vehicle of claim 3 further comprising an actuator secured to the body and to the charging pad, wherein the actuator is configured to transition the charging pad between the stowed position and the engaged position.

7. The vehicle of claim 6, wherein the actuator is disposed within the cavity.

8. The vehicle of claim 6 further comprising a controller programmed to,
    in response to a command to park the vehicle and initiate the charging event, operate the actuator to transition the charging pad from the stowed position to the engaged position, and in response to a command to initiate the non-charging event, operate the actuator to transition the charging pad from the engaged position to the stowed position.

9. The vehicle of claim 6 further comprising a controller programmed to, in response to a command to park the vehicle and initiate the charging event, operate the actuator to transition the secondary coil from the stowed position to the engaged position, and in response to a command to initiate the non-charging event, operate the actuator to transition the secondary coil from the engaged position to the stowed position.

10. The vehicle of claim 1 further comprising a spring secured to the charging pad, wherein the spring is configured to compensate for positional tolerances of the charging pad during an engagement between the charging pad and a charger pad housing the primary coil during the charging event.

11. A vehicle comprising:

a body having a length and a width, a rear axle extending along the width of the body and having first and second wheels;

an electric machine configured to propel the vehicle;

a battery configured to deliver electrical power to the electric machine;

a secondary coil (i) secured to a bottom of the body, (ii) disposed between the rear axle and a rear end of the vehicle along the length of the body, (iii) spanning a distance between the first and second wheels along the width of the body, and (iv) configured to receive electrical power from a primary coil via induction to recharge the battery; and an elastic bumper (i) secured to a bottom of the secondary coil and (ii) configured to engage the primary coil during a charging event, wherein the elastic bumper is separated from the body by the secondary coil.

12. The vehicle of claim 11, wherein the bottom of the body defines a cavity between the rear axle and the rear end of the vehicle, and wherein the secondary coil is disposed within the cavity.

13. The vehicle of claim 11, wherein the secondary coil is oriented at an angle relative to a bottom surface of the body that ranges between 10° and 30°.

14. The vehicle of claim 11, wherein the secondary coil is rotatably secured to the body and is configured to rotate relative to the body between a stowed position during a non-charging event and an engaged position during the charging event.

15. The vehicle of claim 14, wherein the secondary coil is substantially parallel with a bottom surface of the body in the stowed position.

16. The vehicle of claim 14, wherein the secondary coil is oriented at an angle relative to a bottom surface of the body that ranges between 10° and 30° in the engaged position.

17. The vehicle of claim 14 further comprising an actuator secured to the body and to the secondary coil, wherein the actuator is configured to transition the secondary coil between the stowed position and the engaged position.

18. The vehicle of claim 11 further comprising a spring secured to the secondary coil, wherein the spring is configured to compensate for positional tolerances of the secondary coil during an engagement between the secondary coil and the primary coil during the charging event.

* * * * *